(12) United States Patent
O'Callaghan

(10) Patent No.: US 6,203,184 B1
(45) Date of Patent: Mar. 20, 2001

(54) BLENDER

(75) Inventor: James Joseph O'Callaghan, Dundalk (IE)

(73) Assignee: Vervant Limited, Dublin (IE)

( * ) Notice: Subject to any disclaimer, the term of this patent is extended or adjusted under 35 U.S.C. 154(b) by 0 days.

(21) Appl. No.: 09/094,601

(22) Filed: Jun. 15, 1998

(30) Foreign Application Priority Data

Jun. 13, 1997 (IE) ........................................ 970440

(51) Int. Cl.[7] .................. B01F 15/04; B01F 15/02
(52) U.S. Cl. .................. 366/141; 366/152.6; 366/153.1; 366/156.1; 366/163.1; 366/181.1; 366/179.1
(58) Field of Search .................. 366/152.6, 153.1, 366/152.1, 151.2, 156.1, 159.1, 160.1, 163.1, 177.1, 179.1, 182.2, 182.4, 318, 144, 321, 194, 195, 196, 192, 191, 181.1, 181.2, 181.3

(56) References Cited

U.S. PATENT DOCUMENTS

| | | | | |
|---|---|---|---|---|
| 1,461,936 | * | 7/1923 | Richards | 366/321 |
| 1,500,061 | * | 7/1924 | Dimm | 366/196 |
| 2,576,177 | * | 11/1951 | Herr | 366/321 |
| 2,894,733 | * | 7/1959 | Wosmek | 366/321 |
| 3,064,908 | * | 11/1962 | Hjelte | 366/194 |
| 3,129,927 | * | 4/1964 | Mast | 366/318 |
| 3,358,970 | * | 12/1967 | Clancy et al. | 366/321 |
| 3,366,368 | * | 1/1968 | Hibbing | 366/196 |
| 3,790,138 | * | 2/1974 | Neier | 366/321 |
| 3,901,483 | * | 8/1975 | Lasar | 366/321 |
| 4,201,348 | * | 5/1980 | Bigbee et al. | 366/321 |
| 4,201,484 | * | 5/1980 | Sasiela et al. | 366/153.1 |
| 4,459,028 | * | 7/1984 | Bruder et al. | 366/156.2 |
| 4,615,647 | * | 10/1986 | Lukacz | 366/192 |
| 4,688,945 | * | 8/1987 | Brazelton et al. | 366/156.1 |
| 4,712,922 | * | 12/1987 | Feterl | 366/321 |
| 4,733,971 | * | 3/1988 | Pratt | 366/141 |
| 4,753,533 | * | 6/1988 | Strehlow | 366/152.6 |
| 5,127,450 | * | 7/1992 | Saatkamp | 366/153.1 |
| 5,230,476 | * | 7/1993 | Rust et al. | 366/160.1 |
| 5,240,324 | * | 8/1993 | Phillips et al. | 366/141 |
| 5,261,743 | * | 11/1993 | Moller | 366/196 |
| 5,433,520 | * | 7/1995 | Adams et al. | 366/152.6 |
| 5,452,954 | * | 9/1995 | Handke et al. | 366/152.1 |

FOREIGN PATENT DOCUMENTS

772578 * 10/1980 (SU) ........................................ 366/194

* cited by examiner

*Primary Examiner*—Tony G. Soohoo
(74) *Attorney, Agent, or Firm*—Jacobson, Price, Holman & Stern, PLLC (57) ABSTRACT

A blender for delivery of blend additives to a plastics extrusion device has a mixing chamber for reception of materials to be blended. Batches of blend materials are delivered to the mixing chamber from material supply bins via a weight hopper. Within the mixing chamber, a mixing screw circulates and mixes the blend materials prior to discharge through an outlet to an extrusion process line. As material is discharged, a material level sensor is uncovered and calls for a further batch of blend materials to be discharged from the weigh hopper into the mixing chamber. The screw has a pair of mixing blades of opposed pitch to direct material inwardly from outer ends of the screw towards a center of the screw located above the outlet. Excess material above process demand requirements is delivered to the outlet by the screw. This excess material is directed upwardly away from the outlet and recirculated towards outer ends of the screw and remixed without material within the mixing chamber.

15 Claims, 6 Drawing Sheets

BLENDER

FIELD OF THE INVENTION

This invention relates to a blending apparatus and method.

The invention particularly relates to a batch blending apparatus for controlled mixing and delivery of particulate blend additives into a material processing device, such as a plastics extruding device, or, in processes requiring blending of material.

BACKGROUND OF THE INVENTION

It is known to provide a blender having a mixing chamber for reception of two or more materials to be blended. A mixing paddle is mounted within the mixing chamber to stir the materials within the mixing chamber for blending the materials within the mixing chamber prior to discharge to a process. A disadvantage with these types of blender is that the mixing tends to be fairly coarse and vigorous within the mixing chamber and thus it can be difficult to achieve an accurate blending of the material additives with the process materials. Also, in these blenders, because of their constructions, there may be dead areas in the mixing chamber where unblended or only partially blended materials collect. Further, these blenders are sensitive to the density and particle size of the material to be blended. It is also difficult to process relatively small quantities of material and achieve the required blend. Thus, these blenders are somewhat limited in the range and quantities of materials that can be successfully blended.

The present invention is directed towards overcoming these problems.

SUMMMARY OF THE INVENTION

According to the invention, there is provided a blender for mixing particulate materials prior to discharge into a process line, the blender comprising a mixing chamber, the mixing chamber having an inlet for reception of additive materials to be mixed and a blended material outlet, mixing means for mixing additive materials within the mixing chamber, delivery means for delivery of blended material to the outlet at a rate greater than the rate of discharge of blended materials through the outlet, and means to direct excess blended material away from the outlet for remixing within the mixing chamber.

In one embodiment, the mixing means is operable to generate and maintain a substantially level top surface in the additive materials within the mixing chamber above the outlet.

In a preferred embodiment, the mixing means comprises a mixing screw rotatably mounted within the chamber, the mixing screw operable to mix two or more materials delivered into the chamber, prior to discharge of the blended materials through the outlet.

Advantageously the use of a mixing screw facilitates good and even blending of the material additives in a controlled manner which minimises agitation of the materials which facilitates more accurate monitoring and control of additive material throughput to the process.

In one embodiment of the invention, the mixing screw has a rotatable shaft with a pair of mixing blades of opposite pitch extending outwardly from a central portion of the shaft which is located adjacent the outlet. Thus, conveniently the mixing screw is operable to direct material towards the outlet of the mixing chamber, while at the same time circulating the material within the mixing chamber for blending of the additive material.

Preferably the mixing screw is demountably secured within the mixing chamber.

Conveniently the mixing screw is movable axially through an opening in a side wall of the mixing chamber for removal. This facilitates easy cleaning of the screw and the mixing chamber as desired.

In a further embodiment there is provided a blender comprising a mixing chamber for reception of two or more materials to be blended, the mixing chamber having a material inlet and a blended material outlet, a mixing screw mounted within the mixing chamber adjacent the outlet for circulating and mixing of materials within the mixing chamber and material level sensor mounted within the chamber, said level sensor connected to a controller which is operable to regulate the supply of fresh materials to the blending chamber for mixing.

Preferably the blender further comprises a weigh hopper having a material inlet and a material outlet, the outlet arranged to discharge material from the weigh hopper to the mixing chamber.

In another embodiment a discharge gate on the weigh hopper outlet is operatively connected to the controller.

In a further embodiment the blender further comprises raw material supply bins, each bin having a discharge valve mounted at an outlet of the material supply bin, each of said discharge valves being operatively connected to the controller to regulate discharge of material from the bin to the weigh hopper or the mixing chamber.

Preferably, each discharge valve comprises a ram operated plate slidably mounted on a complementary track, the plate engagable with a downwardly depending discharge collar at the outlet to close the outlet.

Conveniently a vacuum loader is provided associated with each material supply bin, the vacuum loader operable to draw material from a material storage reservoir into the bin, said vacuum loader having a vacuum pipe connected to the bin with a filter mounted across said vacuum pipe, cleaning means being provided to clean the filter.

Preferably the cleaning means comprises an air jet operable to automatically back-flush the filter after each fill cycle.

In another embodiment, an auxiliary supply bin is provided with a discharge screw at an outlet of the auxiliary bin for delivery of material to the mixing chamber, said screw rotatably mounted within a complementary barrel, a non-return flap valve being mounted at an outlet end of the barrel.

In a further embodiment, an access door is provided on the mixing chamber, said access door operably engagable with switches for isolating electric and pneumatic power supply to the blender when the door is open.

In another embodiment, a complementary pair of capacitor plates are mounted in each material supply bin, said plates being connected to a controller operable to determine the level of material in the bin.

In another embodiment, the blender incorporates a material bulk density measurement device.

Preferably, the bulk density measurement device comprises a chamber which is filled with material during operation of the blender, an associated pair of capacitor plates being mounted within the chamber and connected to a controller operable for determining the bulk density of material between the plates.

In another aspect, the invention provides a level measurement device for measuring the level of material in a bin or container, the device comprising a complementary pair of capacitor plates mounted within the bin, said plates being connected to a controller operable to determine the level of material in the bin.

In a still further aspect, the invention provides a bulk density measurement device comprising a chamber which is filled with material, the bulk density of which is to be measured, an associated pair of capacitor plates mounted within the chamber and connected to a controller which is operable for determining the bulk density of material between the plates.

BRIEF DESCRIPTION OF THE DRAWINGS

The invention will be more clearly understood from the following description of some embodiments thereof given by way of example only with reference to the accompanying drawings in which.

Detailed Description of the Preferred Embodiments

Referring to the drawings and initially to FIGS. 1 to 9 thereof, there is illustrated a blender according to the invention indicated generally by the reference numeral 1. The blender 1 has a mixing chamber 2 for reception of two or more materials to be blended. A mixing screw 3 is mounted within the mixing chamber 2 adjacent an outlet 4 of the mixing chamber 2 for circulation and mixing of materials within the mixing chamber 2 prior to discharge through the outlet 4. A material level sensor 5 is mounted within the chamber 2 above the screw 3. The level sensor 5 is connected to a controller (not shown) which is operable to regulate the supply of fresh materials to the mixing chamber 2 for mixing. In addition, the sensor 5 allows the calculation of the rate of use of material.

Figure 1:
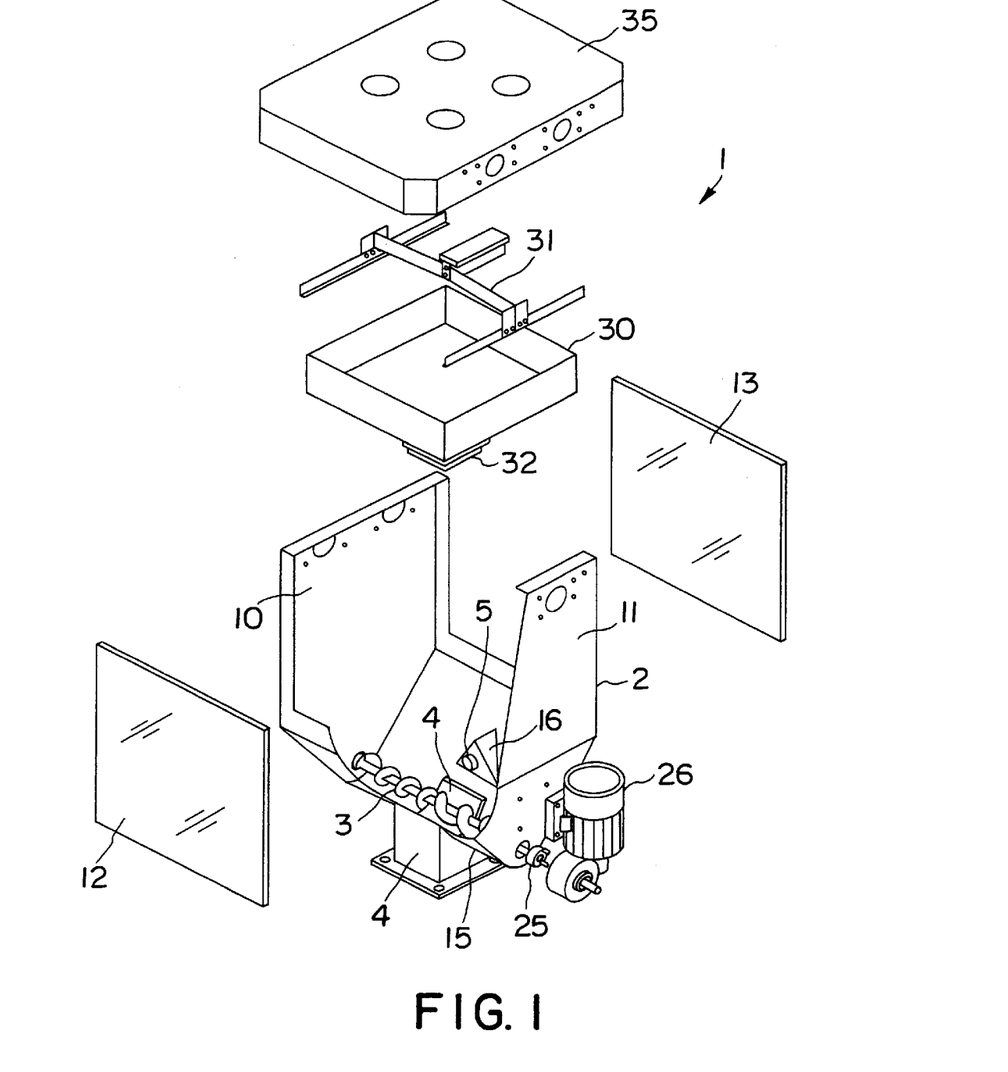
FIG. 1 is an exploded, partially cut-away perspective view of a blender according to the invention.

The mixing chamber 2 has an upper portion comprising upright side walls 10, 11 and associated front wall formed by an access door 12 and rear wall 13 extending between the side walls 10, 11. A lower portion of the mixing chamber 2 tapers inwardly and downwardly towards the material outlet 4 which is centrally located in a bottom of the mixing chamber 2 which essentially forms a trough 15 for complementary reception of the screw 3. Thus, because of the construction of the mixing chamber 2, all material is delivered into the trough 15 and then directed by the screw 3 to the outlet 4, There are no dead areas where material can collect.

The sensor 5 is mounted on a support 16 which has a tapered top to facilitate free flow of material downwardly within the bottom 15 of the chamber 2. This facilitates maintaining an even, substantially level top surface generated by the action of the screw 3 in the material as it moves downwardly through the chamber 2 as it is discharged through the outlet 4.

Figure 2:
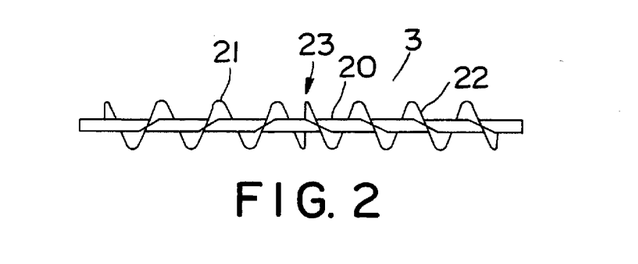
FIG. 2 is an elevational view of a material mixing screw shaft forming portion of the blender.
Figure 3:
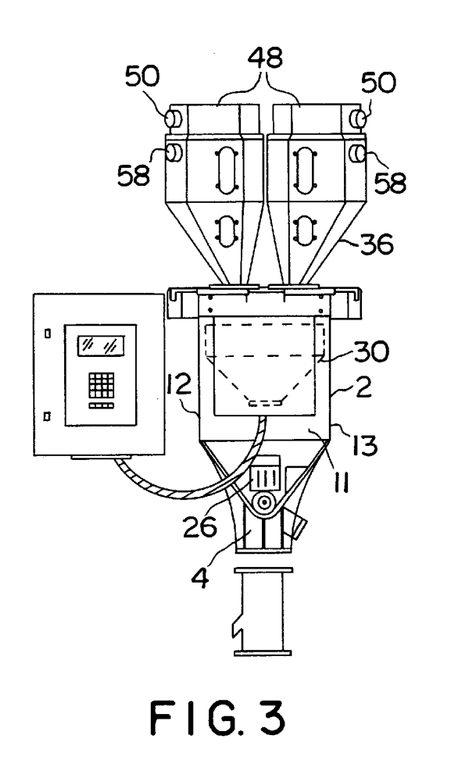
FIG. 3 is an end elevational view of the blender.
Figure 4:
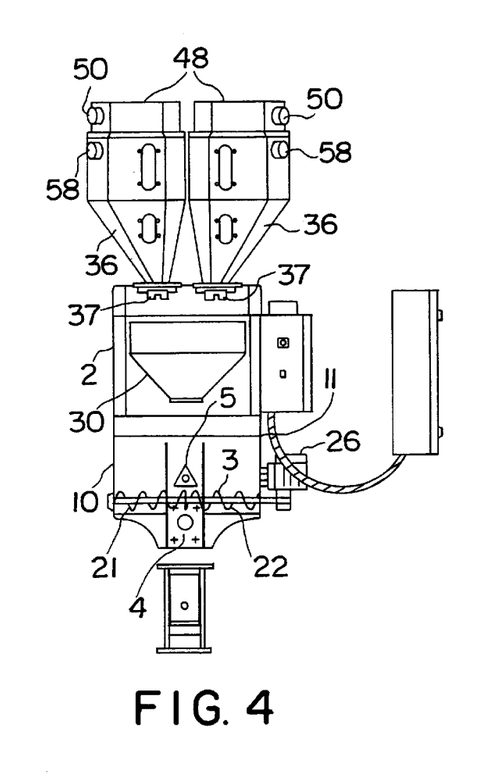
FIG. 4 is a front elevational view of the blender.
Figure 5:
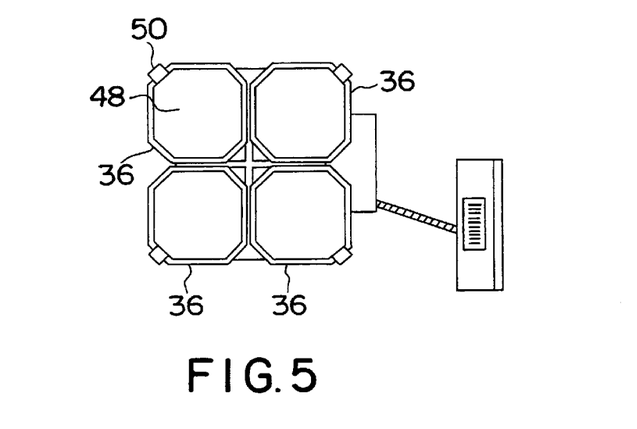
FIG. 5 is a plan view of the blender.
Figure 6:
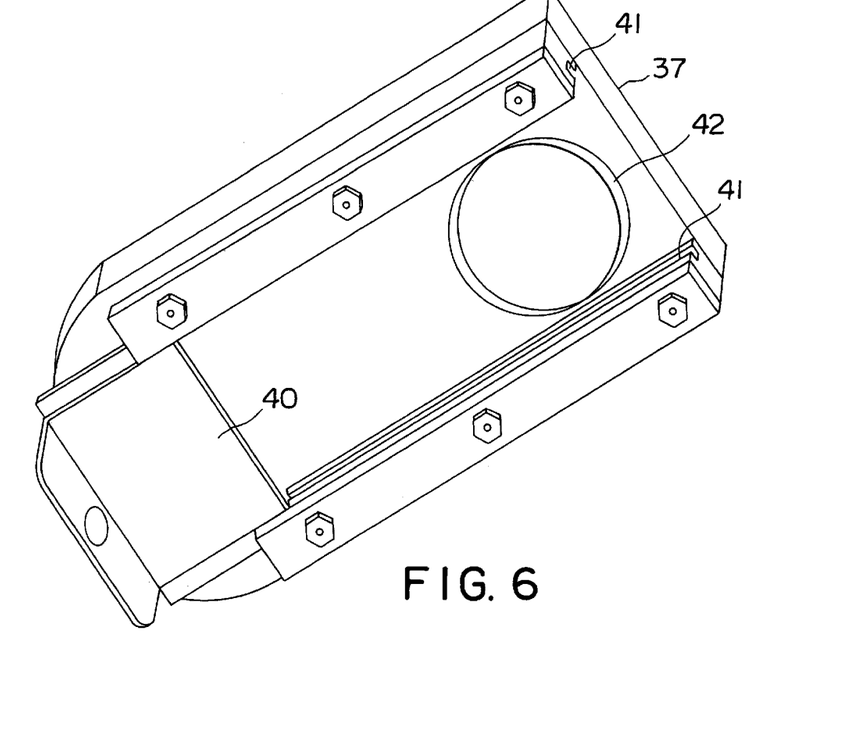
FIG. 6 is a detail perspective view of a slide valve forming portion of the blender.

The screw 3 has a central shaft 20 with a pair of mixing blades 21, 22 of opposite pitch extending outwardly from a central portion 23 of the shaft 20 which is located directly above the outlet 4. It will be noted that an inner end 25 of the screw projects through the side wall 11 for engagement with an associated drive motor 26. The screw 3 is movable through an opening in the opposite side wall 10 for removal of the screw 3 from the chamber 2 for cleaning the screw and/or chamber 2. A motor engaging end of the screw 3 has a quick release coupling for engaging with and release from the motor 26. An opposite free end of the screw 3 has a mounting flange which is engagable with quick release clips on the side wall 10 to retain the screw 3 in position and facilitate rapid removal as required.

Mounted directly above the chamber 2 is a weigh hopper 30 which is suspended by a load cell hanging mechanism 31 of the type described in our previous Irish Patent Application No. 95 0706. The weigh hopper 30 has an open top and a discharge outlet 32 closed by a ram operated flap.

Mounted directly above the weigh hopper 30 on a support platform 35 are a number of raw material supply bins 36. A lower end of each bin 36 has an outlet closed by a discharge valve 37. Each of the discharge valves 37 are operatively connected to the controller to regulate the discharge of material from the bins 36 into the weigh hopper 30. A discharge valve 37 is shown in more detail in FIG. 6 and comprises a ram operated plate 40 slidably mounted on complementary tracks 41. The plate 40 is engagable with a downwardly depending discharge collar 42 at the outlet of a bin 36. An upper face of the plate 40 engages against a rim of the collar 42 to securely close off the outlet from the bin 36. The tracks may be made of any suitable material such as plastics material such as an acetyl material for standard use or a polycarbonate material for high temperature use.

Figure 7:
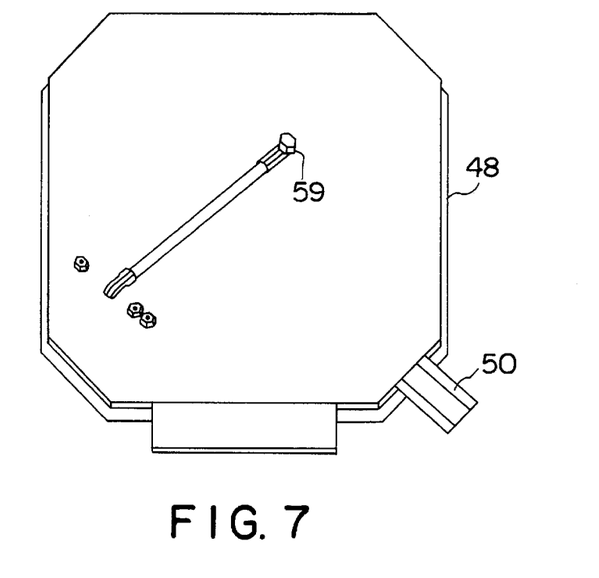
FIG. 7 is a perspective view of a vacuum chamber forming portion of the blender.
Figure 8:
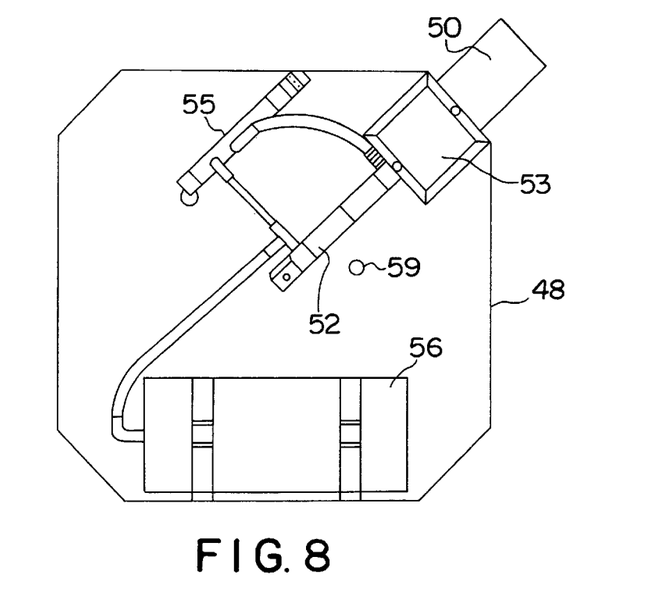
FIG. 8 is an underneath plan view of the vacuum chamber.
Figure 9:
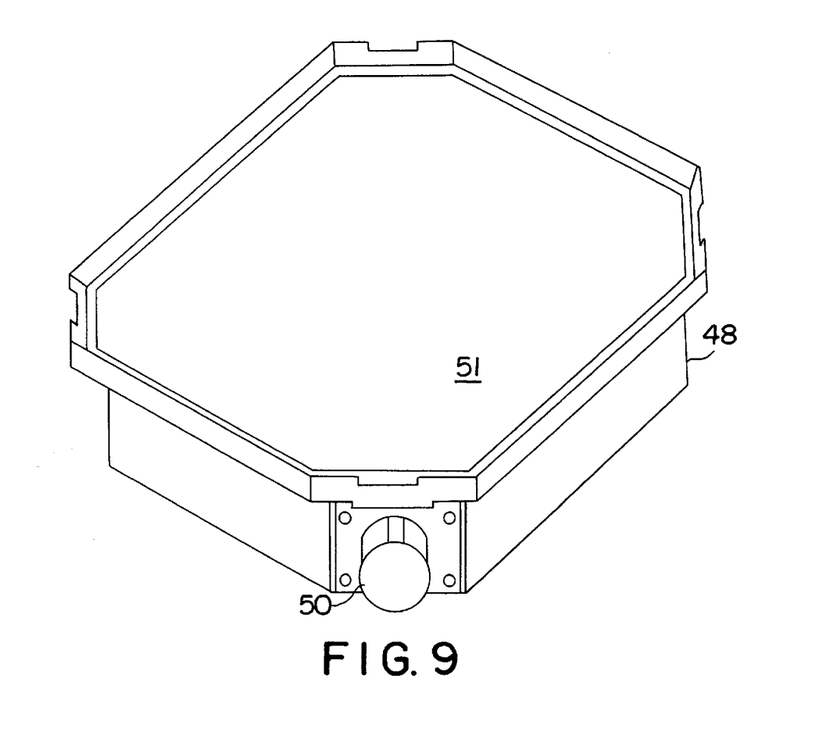
FIG. 9 is an underneath perspective view of the vacuum chamber with a filter in place.

A vacuum loader 48 associated with each material supply bin 36. The vacuum loader 48 essentially comprises a vacuum chamber 49 mounted on top of each bin 36 and communicating by a pipe 50 with a vacuum pump to apply a vacuum to each bin 36 when a vacuum control valve in each vacuum pipe 50 is opened. A filter 51 is mounted across a bottom of the chamber 49 to prevent dust and fine materials being drawn to the vacuum pump. Mounted within the vacuum chamber 49 is a pneumatically operated ram 52 for operating a valve 53 which is engagable with an end of the vacuum pipe 50. A shuttle valve 55 controls air supply to the ram 52 for opening and closing the valve 53. The shuttle valve 55 also controls air supply to a pressurised air reservoir 56. In use, to fill a bin 36 the ram 52 is operated to open the valve 53 and apply a vacuum to an interior of the bin 36. This vacuum then causes material to be sucked in from a remote supply reservoir into the bin 36 through an inlet pipe 58. A level sensor mounted within the bin 36 detects when material is required, and operates the vacuum filing system to fill the bin 36 up to the level sensor and continues filling for a preset period to fill the bin 36 to a desired level and then switches off the vacuum by operating the ram 52 to close the valve 53. Alternatively, high and low level sensors could be used. Then air is vented back from the cylinder 56 through an inlet nozzle 59 at a top of the chamber 49 to back flush the filter 51 blowing down through the filter 51 into the bin 36 cleaning the filter 51.

The front access door 12 is preferably of clear plastics material and is hingedly mounted on a side wall 10,11 of the mixing chamber 2 to provide an access door to the mixing chamber 2. This access door 12 is operably engagable with associated switches (not shown) for cutting out electric and pneumatic power supply to the blender 1 when the door 12 is opened to prevent injury or damage when cleaning or maintaining the blender 1. In addition to isolating the pneumatic power supply, the rams for the discharge valves 37 are vented so that they can be manually operated for cleaning.

In use, the screw 3 rotates and urges material in the chamber 2 inwardly towards the outlet 4. Some mixed material will be discharged through the outlet 4 on demand to the process. Other materials will be recirculated within the chamber 2 for mixing. Preferably, the screw 3 speed is such that the material is circulated and mixed several times before being discharged through the outlet 4. The weight hopper is charged with additive material. As the level of additive material within the chamber 2 drops and the sensor 5 is uncovered, the controller is operable to dump a batch of materials from the weigh hopper 30 into the mixing chamber 2. Then materials from selected supply bins 36 are sequentially weighed into the weigh hopper 30 for subsequent discharge on demand into the chamber 2 when the level drops again for mixing within the chamber 2 prior to delivery to the process.

It will be appreciated that the design of the blender allows for easy removal and servicing of the mixing screw which also allows for ease of cleaning of the mixing chamber.

It will also be noted that the mixing chamber and mixing screw design also allow for the feeding of other materials directly into the mixing chamber without passing through the weigh hopper.

If required, means may be provided for injecting liquid additives at the outlet or into the mixing chamber.

Furthermore, a modification in the mixing screw design detail at a point directly above the feed to the process allows the feeder to feed materials that might not flow naturally into the process—by "cramming" such materials via the flights on a modified screw or other means. Examples of such materials are low density re-processed film (fluff), etc. A particularly useful device for this is a helically wound wire screw rotatably mounted on a side wall of the mixing chamber 2.

The controller regulates the amount of material filled from each material component and sequentially fills the required ratio of material from each material supply bin into the weigh hopper to achieve the blend required. The material level sensor within the mixing chamber determines when more material is required. The contents of the weigh hopper are then dumped into the mixing chamber.

The level sensor within the mixing chamber detects when the last batch of material has been used by the process which then enables the controller to calculate the usage rate in lbs/hour or Kg/hour and control same to keep the process output constant.

Furthermore, by monitoring the speed of the process (e.g. process screw speed and/or line speed) the controller can calculate the yield or weight per unit length and can also control same automatically by varying the speed set point for the screw drive.

It will be appreciated that the design of the mixing and feeding screw provides compact but positive mixing of the batch fed material without risk of separation of different materials.

Furthermore, it provides a stable material level which allows accurate and consistent level sensing which in turn determines the control accuracy and response time.

Figure 10:
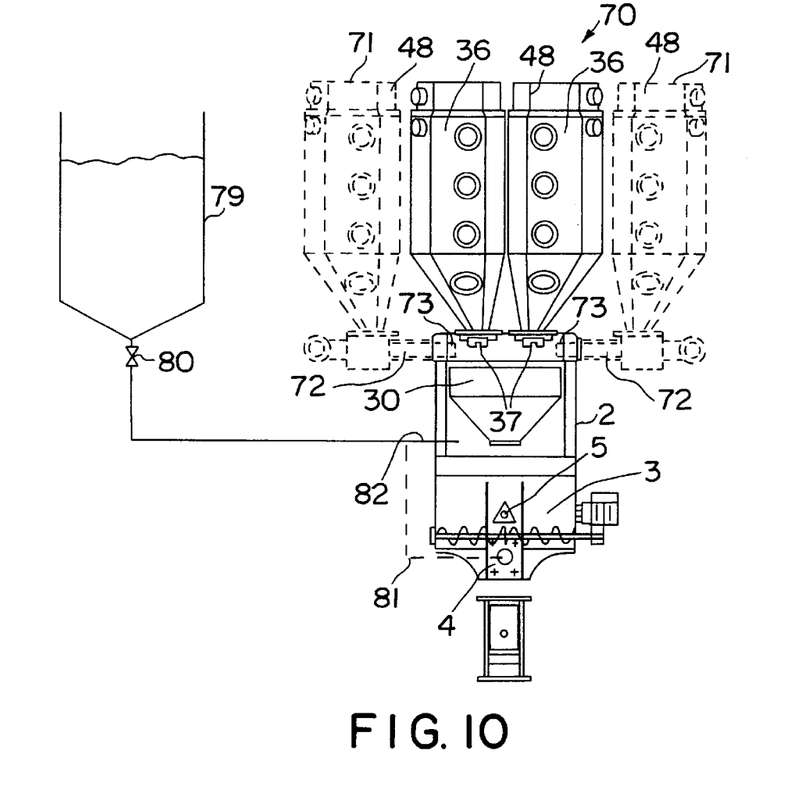
FIG. 10 is an elevational view of another blender.
Figure 11:
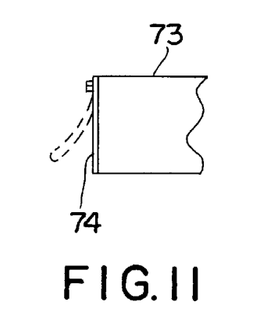
FIG. 11 is a detail view of portion of the blender of FIG. 10.
Figure 12:
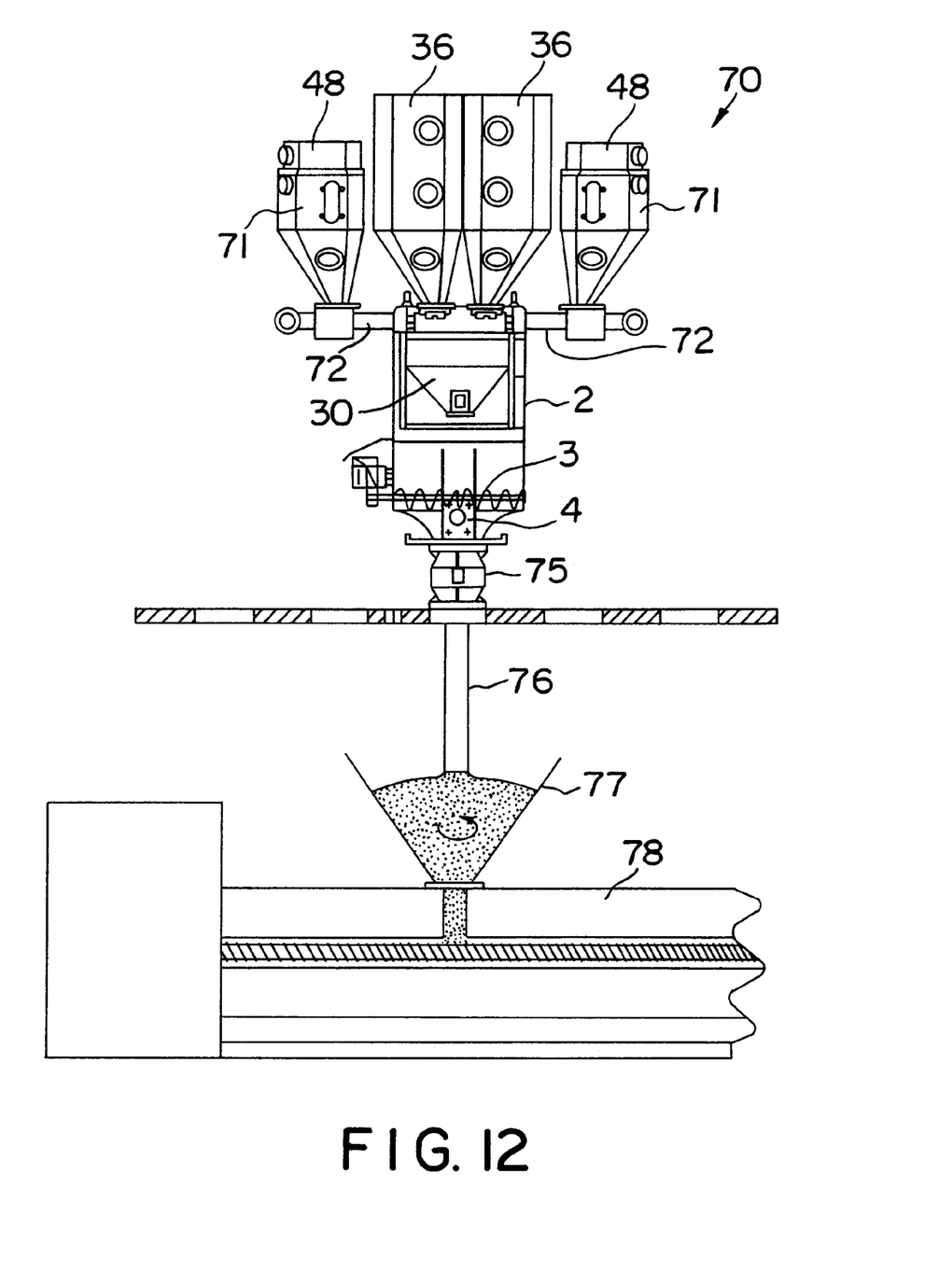
FIG. 12 is a sectional elevational view of the blender of FIG. 10 in use in an off-line application.

Referring now to FIGS. 10 to 12 there is illustrated another blender 70. The blender 70 is largely the same as the blender previously described and like parts are assigned the same reference numerals. This case auxiliary supply bins 71 are mounted at each side of the mixing chamber 2. Each bin 71 has a discharge screw 72 at an outlet of the bin 71 for discharging material into the weigh hopper 30. When discharging material from the bin 71 the screw is rotated by an associated motor for a set period to deliver a desired quantity of material weigh hopper 30. The screw 72 is mounted within a complementary barrel 73. A flexible non-return flap valve 74 is mounted at an outlet end of the barrel 73. Thus when vacuum filling the bin 71 the flap valve 74 closes over the end of the barrel 73 to stop drawback of material into the bin 71 which would adversely effect the accuracy of the delivery of material from the bin 71. The flap valve 74 deflects, as shown in broken outline, to allow discharge of material from the end of the barrel when the screw 72 operates.

The blender 70 is shown in an off-line application. A pinch valve 75 is mounted directly below the outlet 4 controlling delivery of material on demand through a pipe 76 to a feed hopper 77 mounted on an extruder 78. The pinch valve 75 is closed when the sensor 5 is uncovered and when the sensor 5 is covered, the pinch valve 75 opens to allow discharge of material to the hopper 77.

It will be appreciated that any of the blenders herein described may be used in either an on-line application, that is directly mounted on an extruder, or an off-line application.

Referring to FIG. 10, a separate hopper 79 may be provided for feeding additive material directly through pinch valve 80 and line 81 to the outlet 4 so that the production line can be kept running during cleaning or repair of faults to the blender. Alternatively, the material from the hopper 79 could be delivered through a line 82 into the chamber 2 below the weigh hopper 30.

Figure 13:
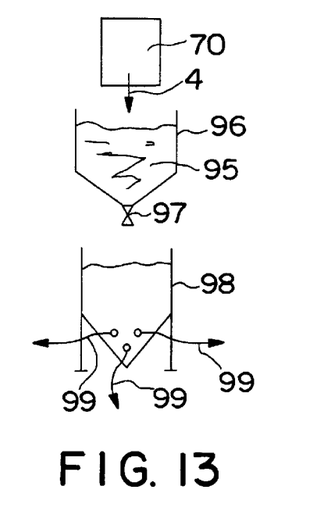
FIG. 13 is a schematic illustration of the blender in another off-line application.

Another off-line application for the blender 1, 70 is shown in FIG. 13. In this case, the blender 1, 70 discharges blended material 95 into a storage hopper 96 having a pinch valve 97 at an outlet of the hopper 96. Upon opening the pinch valve 97, blended material is discharged into an extrusion line supply bin 98 having a number of take-off lines 99 for delivery to extruders or the like.

Figure 14:
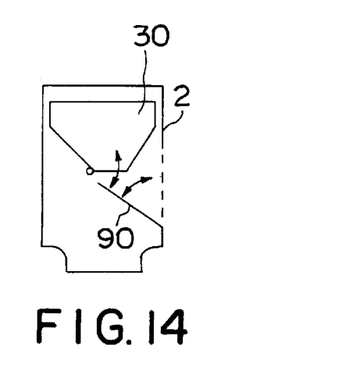
FIG. 14 is a schematic illustration of another blender incorporating a diverter for cleaning.

Referring to FIG. 14, a diverter flap 90 may be mounted on the side walls of the mixing chamber 2 which can be moved from a retracted position (shown in broken outline) into a position beneath the weigh hopper 30 to direct material out of the mixing chamber 2. This would facilitate the cleaning of the bins 36.

For measurement of the level of material in the bins 36, a pair of spaced-apart capacitor plates may be provided connected to the controller which uses a measure of the capacitance to determine the level of material within the bin 36. Either a pair of plates may be provided or one plate may be formed by the wall of the bin 36.

In similar fashion, the bulk density of the material may be determined by providing a chamber, say at an outlet of one of the bins 36, 71, which is continually full of material. A pair of capacitor plates is provided in the chamber and the capacitance used to determine the bulk density of the material being delivered through the chamber. This is particularly useful in set-up situations to get the process on line in a minimum time.

It will be appreciated that instead of a single screw with blades of opposite pitch, a pair of screws may be provided within the mixing chamber for direction of the material towards the outlet.

The invention is not limited to the embodiments hereinbefore described which may be varied in both construction and detail.

What is claimed is:

1. A blender for mixing particulate materials prior to discharge to a process line, the blender comprising:

a mixing chamber, the mixing chamber having an inlet for reception of additive materials to be mixed and a blended material outlet, a lower portion of the mixing chamber tapering inwardly and downwardly towards a bottom of the mixing chamber which forms a trough, the blended material outlet being centrally located in the trough at the bottom of the mixing chamber, a mixing screw rotatably mounted in the trough at the bottom of the mixing chamber, the mixing screw having a central portion located above the blended material outlet, the mixing screw having a rotatable shaft with a pair of mixing blades of opposite pitch extending outwardly from the central portion of the mixing screw located adjacent the blended material outlet, each mixing blade upon rotation of the shaft delivering material towards said blended material outlet, the mixing screw being connected to drive means for rotation of the mixing screw within the trough at the bottom of the mixing chamber for circulating and mixing of materials within the mixing chamber, a vacuum loader being provided associated with each material supply bin, the vacuum loader operable to draw material from a material storage reservoir into the bin, said vacuum loader having a vacuum pipe connected to the bin with a filter mounted across said vacuum pipe, cleaning means being provided for cleaning the filter.

2. A blender as claimed in claim 1, wherein the mixing screw is demountably secured within the mixing chamber.

3. A blender as claimed in claim 2, wherein the mixing chamber has a side wall, said side wall having an opening the mixing screw being movable axially through the opening for insertion into the mixing chamber and for removal from the mixing chamber.

4. A blender as claimed in claim 1, wherein a material level sensor is mounted withing the mixing chamber above the mixing screw, said level sensor is connected to a controller which is operable to regulate the supply of fresh materials to the mixing chamber for mixing.

5. A blender as claimed in claim 1, wherein the blender further comprises a weigh hopper having a material inlet and a material outlet, the outlet arranged to discharge material from the weigh hopper to the mixing chamber.

6. A blender as claimed in claim 5, wherein the blender further comprises raw material supply bins, each bin having a discharge valve mounted at an outlet of the material supply bin, each of said discharge valves being operatively connected to a controller to regulate discharge of material from the bin to the weigh hopper or the mixing chamber.

7. A blender as claimed in claim 6, wherein each discharge valve comprises a ram operated plate slidably mounted on a complementary track, the plate engagable with a downwardly depending discharge collar at the outlet to close the outlet.

8. A blender as claimed in claim 6, wherein a complementary pair of capacitor plates are mounted in each material supply bin, said plates being connected to a controller operable to determine the level of material in the bin.

9. A blender as claimed in claim 6, wherein one or more of the material supply bins incorporates a material bulk density measurement device, the bulk density measurement device comprises a chamber which is filled with material during operation of the blender, an associated pair of capacitor plates being mounted within the chamber and connected to a controller operable for determining the bulk density of material between the plates, said chamber being mounted at the outlet of the material supply bin.

10. A blender as claimed in claim 1, wherein the cleaning means comprises an air jet operable to back-flush the filter.

11. A blender as claimed in claim 1 wherein an auxiliary supply bin is provided with a discharge screw at an outlet of the auxiliary bin for delivery of material to the mixing chamber, said screw rotatably mounted within a complementary barrel, a non-return valve being mounted at an outlet end of the barrel.

12. A blender for mixing particulate materials prior to discharge into a process line, the blender comprising:

a mixing chamber, the mixing chamber having an inlet for reception of additive materials to be mixed and a blended material outlet, a mixing screw for mixing additive materials within the mixing chamber, for delivering blended materials to the outlet at a rate greater than the rate of discharge of blended materials through the outlet, and for directing excess blended material away from the outlet for remixing within the mixing chamber, raw material supply bins, each bin having a discharge valve mounted at an outlet of the material supply bin, each of said discharge valves being operatively connected to a controller to regulate discharge of material from the bin to a weigh hopper or the mixing chamber, and a vacuum loader associated with each material supply bin, the vacuum loader being operable to draw material from a material storage reservoir into the bin, said vacuum loader having a vacuum pipe connected to the bin with a filter mounted across said vacuum pipe, and cleaning means being provided to clean the filter.

13. A blender as claimed in claim 12, wherein the cleaning means comprises an air jet operable to backflush the filter.

14. A batch blender for mixing particulate materials prior to discharge into a process line, the blender comprising:

a mixing chamber, the mixing chamber having an inlet for reception of a batch of additive materials to be mixed and a blended material outlet, a lower portion of the mixing chamber tapering inwardly and downwardly towards a bottom of the mixing chamber which forms a trough, the blended material outlet being centrally located in the trough at the bottom of the mixing chamber, a mixing screw rotatably mounted in the trough at the bottom of the mixing chamber, the mixing screw having a central portion located above the blended material outlet, the mixing screw having a rotatable shaft with a pair of mixing blades of opposite pitch extending outwardly from the central portion of the mixing screw located adjacent the blended material outlet, each mixing blade, upon rotation of the shaft, delivering material towards said blended material outlet, the mixing screw being connected to drive means for rotation of the mixing screw within the trough at the bottom of the mixing chamber for circulating and mixing of materials within the mixing chamber, said mixing screw being operable to deliver blended material to the outlet at a rate greater than the rate of discharge of blended materials through the outlet, and for directing excess blended material away from the outlet for re-mixing within the mixing chamber, a level sensor mounted within the mixing chamber above the mixing screw, the level sensor being connected to a controller which is operable to regulate the supply of fresh materials to the mixing chamber for mixing, said controller being operable to deliver a batch of additive materials into the mixing chamber when the level of material within the mixing chamber drops to the level sensor.

15. A batch blender as claimed in claim 14, wherein a weigh hopper is mounted above the mixing chamber, the weigh hopper having an outlet for discharge of material from the weigh hopper to the mixing chamber, the weigh hopper being connected to the controller for controlling discharge of material from the weigh hopper, the level sensor being operatively connected to the controller for controlling discharge of material from the weigh hopper into the mixing chamber to maintain a desired level of particulate material within the mixing chamber above the mixing screw.

* * * * *